Patented Jan. 4, 1944

2,338,457

UNITED STATES PATENT OFFICE 2,338,457

PROCESS FOR PREPARING STARCH PRODUCTS

Meindert Danius Rozenbroek, Delden, Netherlands; vested in the Alien Property Custodian No Drawing. Application December 15, 1939, Serial No. 309,485. In the Netherlands December 27, 1938

2 Claims. (Cl. 127—33)

It is known to convert starch by means of hypochlorites. For this purpose the starch is brought into contact with a diluted solution of a hypochlorite and if desired a catalyst is used. In some cases the starch to be treated is suspended in a solution of a suitable alkali carbonate in water and chlorine is introduced into this solution. After the treatment has been carried out to the desired degree the starch is allowed to settle; the upper layer consisting of a solution of sodium chloride of starch are present. The sediment is washed with water and afterwards dried. The drying must be carried out with care in order to prevent the formation of lumps, hard crusts and the like. The drying is very cumbersome and a part of the starch is lost due to the formation of decomposition products which are removed by the washing-water.

I have found that valuable products can be obtained without the above drawbacks being encountered if chlorine in the form of a gas or a liquid is added to a mixture of starch or starch like products with a suitable alkaline substance such as carbonate of sodium, sodium hydroxyde in the form of a powder, potassium carbonate, borax, trisodiumphosphate and the like. The process will be elucidated by the following examples which, however, do not limit the scope of my invention.

Example I 100 parts by weight of potato flour are mixed with 24 parts by weight of crystal soda. This mixture is treated with chlorine gas in an agitating-vessel till all carbonate of soda has been neutralized. Instead of adding the sodium carbonate in bulk it is in some cases of advantage to add the soda little by little, e. g., in two or more portions as the process proceeds. Care is to be taken that during the treatment the temperature does not exceed 60° C.

After the conversion with chlorine has been finished the product may be left unaltered or the product may be rendered substantially neutral by addition thereto of acid or alkali. The neutral or slightly alkaline product is soluble in water to yield a clear solution which, after cooling, remains clear or at least substantially so. Instead of crystal soda I may use also sodium carbonate in the form of a powder or an equivalent weight of potassium carbonate. Instead of potato flour I may use also different starches such as rice, sago, maize, wheat, tapioca starch, tapioca root flour and the like. Further starches containing protein or glutine such as potato flour in the form of flakes, wheat flour and the like may be used.

Example II 100 kg. of potato flour in an air-dry condition are mixed with 12 kg. waterfree sodium carbonate. Thereupon chlorine gas is introduced till the reaction has become weakly acid towards litmus. Instead of adding the soda in bulk it may be of advantage to add the same gradually, e. g., in two or more portions as the process proceeds. The product mixed with ½-1.½% borax forms in a 50% concentration a thin boiling solution in water.

Example III 100 kg. of potato starch with 20% moisture are mixed with 8 kg. waterfree sodium carbonate or 16 kg. crystal soda. Thereupon chlorine gas is introduced till the reaction is weakly acid. The product obtained in this way is now mixed with ¼-1% of perborate. This flour gives a clear and colourless solution which at a boiling point in a concentration of about 35% is relatively thin.

Example IV 100 kg. of potato flour with about 20% of moisture are mixed with 15 kg. of trisodium phosphate in the form of a powder. Chlorine gas is introduced till the reaction is weakly acid. I may also use starches which have been altered by roasting, i. e., dextrines. These dextrines may be obtained by means of known processes but also by means of the processes as described in my co-pending applications of even date.

Example V 100 kg. of potato flour are mixed during about 4 hours with 100 g. of nitric acid (specific weight 1.4) to 110° C. Thereupon the mixture is cooled and moistened till the dextrine obtained contains about 12% of moisture. Thereupon 20 kg. of sodium carbonate are added in two portions, chlorine being introduced after the addition of each portion till the reaction is weakly acid. The product obtained is very good, colourless and soluble in boiling water. It keeps its fluidity after cooling and remains clear or nearly clear. Also cold soluble starch, cold soluble dextrine or swelling-starch obtained by treating with alkali or by drying in thin layers may be treated according to my process. It is observed that these cold soluble products cannot be treated with liquids inasmuch as they would give rise to the formation of lumps so that my process possesses special advantages in this respect.

Example VI 100 kg. of potato flour are treated with 2% of hydrochloric acid gas and kept at 30° C. during 12 hours. Thereupon 20 kg. of sodium carbonate are added in two portions (first portion 14 kg. and second portion 6 kg.). After each addition chlorine gas is introduced till the reaction is weakly acid. The product obtained is very good, clear and colourless when dissolved in boiling water. After cooling it keeps its fluidity and remains clear or nearly clear.

The product obtained by a combined treatment with chlorine and sodium carbonate or a different alkali may be converted further by the addition of oxydizing agent, such as perborate or enzymes such as diastafor or I may subject these products to a dextrinizing action.

As a dextrinizing method I may use the usual methods or such processes as described in my co-pending applications of even date.

Example VII 100 kg. of potato flour with a moisture content of 20% are mixed with 4-8 kg. of waterfree sodium carbonate. Chlorine gas is introduced till the reaction is weakly acid. Thereupon 2% hydrochloric acid is brought into contact with the flour and the mixture is heated to 50° C. for 30 minutes.

The product obtained in this way dissolves in boiling water in concentration up to 40% very easily and without colouring. After cooling the solution remains clear or at least substantially so. The products obtained may be used for the same purposes for which starch treated with a diluted solution of hypochlorite may be used, i. e., in the textile industry, in the paper manufacture, in the preparation of leather, for preparing adhesives and the like.

In those cases in which complete absence of salt is desired the product may be mixed with water and the sodium chloride or the other chlorides may be removed. After drying the starch product freed from salt is white, has a good taste and may be used as an addition to articles of food.

Example VIII

The product obtained according to Example VI is brought into solution in an excess of water after which it is allowed to settle, and dried carefully. The salt-free product has a good taste and can be added to a number of readily digestible food stuffs.

It is possible to carry out the dextrinizing after having treated the starch with chlorine in the presence of a suitable alkali after the flour obtained is freed from salt and after having been dried.

Example IX 100 parts by weight of tapioca flour with a moisture content of 15% are mixed with 10 parts of water-free sodium carbonate. Chlorine gas is introduced till the reaction is weakly acid. The product obtained dissolves easily in boiling water and gives a clear solution in concentrations up to and gives a solution like glue a strength of 20%; it gives a solution like glue and is very suitable for use in the textile industry.

Example X 100 parts by weight of maize starch with a moisture content of 15% are mixed with 20 parts waterfree sodium carbonate. Thereupon chlorine gas is introduced till the reaction is weakly acid. By means of an alkaline reacting salt (e. g., borax, trisodium phosphate) the product is made neutral to weakly alkaline. The product obtained is soluble in boiling water in concentrations up to a concentration of 60% and at cooling gives a greasy paste with a high adhesive power and is very suitable as an adhesive in the paper industry and the textile industry.

Example XI 100 parts by weight of potato flour with a water content of 10-15% are thoroughly mixed with 5% of sodium hypochlorite with 300 g. active chlorine per liter. Thereupon the product is mixed with 15% of sodium carbonate and chlorine is introduced till the reaction is neutral to weakly acid. The product obtained dissolves clearly in boiling water up to a concentration of 50-60%.

Example XII 100 parts by weight of potato flour are suspended in 150 parts by weight of water which contain sodium hypochlorite with 150 g. active chlorine per liter till the reaction has become neutral or at most weakly acid. Thereupon the potato flour is allowed to settle, the upper layer of salt solution is removed and the potato flour is dried to a water content of 25-30%. The product is mixed with 12 parts by weight of waterfree sodium carbonate and chlorine gas is introduced till the reaction is neutral. The product obtained dissolves very easily and clearly in boiling water up to a concentration of 50%. The advantage of my process over the wet method is that the losses are much less as during the treatment with a small proportion of sodium hypochlorite no or only a small part of the decomposition products of the flour enter into solution, which part is lost by removing the salt solution.

My process can be carried out in agitating or mixing vessels and conveyor troughs which may be cooled. The flour can be brought into contact with a gas stream, e. g., in a tower or I may use closed vessels in which an increased pressure may be applied. The latter method is necessary in case liquid chlorine is to be sprayed onto the flour.

The treatment in the presence of alkali hydroxide in the form of a powder can be carried out in such a way that the starch is thoroughly mixed with this substance, if desired in a ball mill and if desired a small proportion of moisture may be added. By this means the swelling power of the starch will be increased and afterwards the sodium hydroxide may be neutralized completely or in part by means of chlorine gas. In this way the swelling promoting reaction of the sodium hydroxide is combined with the conversion by means of hypochlorites in statu nascendi. Instead of a suitable alkali I may also use earth alkali oxydes, hydroxydes and carbonates and metal oxydes, e. g., $Ca(OH)_2$, $Ba(OH)_2$, $Mg(OH)_2$, $CaCO_3$, $BaCO_3$, $MgCO_3$, $ZnO$ and the like.

It is observed that the temperature should not be too high as otherwise too much moisture would be removed. If desired I may add water in a finely divided condition or in the form of vapor to the reaction mixture.

It may be of advantage to use chlorine gas in a not concentrated condition but in a diluted state, e. g., mixed with carbonic acid, air or other suitable gases. I may also use solutions of chlorine in liquids, e. g., water, and also pressure may be used.

I claim:

1. Treatment process for producing soluble starch that comprises mixing about 100 parts by weight of divided starch material containing about 8 to 20% of moisture with about 15 parts by weight of solid sodium carbonate and passing gaseous chlorine in the amount of about 6% by weight of the starchy material, into the mixture at a temperature less than about 60° C. so as to form in situ, sodium hypochlorite which is decomposed to furnish a source of nascent chlorine for the conversion of the starch.

2. Treatment process for producing soluble starch that comprises mixing about 100 parts by weight of divided starchy material containing about 8 to 20% of moisture with about 4 to 15 parts by weight of solid sodium carbonate and passing gaseous chlorine in the amount of about 6% by weight of the starchy material, into the mixture at a temperature less than about 60° C. so as to form in situ, sodium hypochlorite which is decomposed to furnish a source of nascent chlorine for the conversion of the starch.

MEINDERT D. ROZENBROEK.